United States Patent
Martinez et al.

(10) Patent No.: US 8,058,201 B2
(45) Date of Patent: Nov. 15, 2011

(54) CLEAN, COMPRESSED SORBENT TABLETS

(75) Inventors: Jim Martinez, Buffalo, NY (US); Louis Patrone, Hamburg, NY (US); Stanislav E. Solovyov, Cheektowaga, NY (US); Jim Zdonczyk, Buffalo, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 0 days.

(21) Appl. No.: 11/941,845

(22) Filed: Nov. 16, 2007

(65) Prior Publication Data
US 2008/0207434 A1    Aug. 28, 2008

Related U.S. Application Data (60) Provisional application No. 60/866,172, filed on Nov. 16, 2006, provisional application No. 60/912,090, filed on Apr. 16, 2007.

(51) Int. Cl.
| | |
|---|---|
| *B01J 29/04* | (2006.01) |
| *B01J 21/16* | (2006.01) |
| *B01J 31/00* | (2006.01) |
| *B01J 21/18* | (2006.01) |
| *B01J 20/00* | (2006.01) |
| *B01J 20/22* | (2006.01) |
| *B01J 20/26* | (2006.01) |
| *B01J 20/02* | (2006.01) |
| *C01B 31/08* | (2006.01) |

(52) U.S. Cl. ........ 502/150; 502/60; 502/80; 502/180; 502/400; 502/401; 502/402; 502/405; 502/416; 502/417

(58) Field of Classification Search ............ 502/60, 502/80, 150, 180, 400–402, 405, 416, 417
See application file for complete search history.

(56) References Cited

U.S. PATENT DOCUMENTS

| | | | | |
|---|---|---|---|---|
| 3,573,106 A | * | 3/1971 | Johnson et al. | 429/135 |
| 3,862,963 A | * | 1/1975 | Hoshi et al. | 502/402 |
| 5,133,016 A | | 7/1992 | Clark | |
| 5,404,105 A | | 4/1995 | Chari | |
| 5,639,550 A | * | 6/1997 | Lisenko | 428/404 |
| 5,640,783 A | | 6/1997 | Schumaier | |
| 5,852,879 A | | 12/1998 | Schumaier | |
| D414,304 S | | 9/1999 | Schumaier | |
| 5,948,398 A | * | 9/1999 | Hanamoto et al. | 424/76.1 |

(Continued)

FOREIGN PATENT DOCUMENTS
WO    2008/061244    *   5/2008

OTHER PUBLICATIONS

International Preliminary Report on Patentability for corresponding International Patent Application No. PCT/US2007/085012 dated May 19, 2009 (7 pages).

(Continued)

*Primary Examiner* — Patricia L Hailey
(74) *Attorney, Agent, or Firm* — Stephen B. Salai, Esq.; Paul A. Leipold, Esq.; Harter Secrest & Emery LLP (57) ABSTRACT

A pressed sorbent form includes a sorbent and a binder. The sorbent is chosen from the group including silica gel, molecular sieve, activated carbon, and clay. The binder is powdered ethyl vinyl acetate.

27 Claims, 3 Drawing Sheets

U.S. PATENT DOCUMENTS

| | | | |
|---|---|---|---|
| 6,399,920 | B1 | 6/2002 | Guinn |
| D467,394 | S | 12/2002 | Schumaier |
| 6,625,900 | B1 | 9/2003 | Tobias |
| 6,630,016 | B2 * | 10/2003 | Koslow .................. 95/285 |
| 6,887,924 | B2 | 5/2005 | McKedy et al. |
| 7,017,276 | B2 | 3/2006 | Greenspan et al. |
| D536,491 | S | 2/2007 | Schumaier |
| 7,182,820 | B2 | 2/2007 | Campbell et al. |
| 7,293,661 | B2 * | 11/2007 | Saaski et al. .................. 210/504 |
| 7,303,683 | B2 * | 12/2007 | Cumberland .................. 210/660 |
| 2003/0080473 | A1 | 5/2003 | Kelly et al. |
| 2004/0262217 | A1 * | 12/2004 | Mori et al. .................. 210/493.1 |
| 2005/0065245 | A1 | 3/2005 | McKedy et al. |
| 2005/0115462 | A1 * | 6/2005 | Disalvo et al. .................. 106/403 |
| 2006/0032851 | A1 | 2/2006 | Hurley et al. |
| 2008/0202336 | A1 * | 8/2008 | Hofer et al. .................. 95/90 |
| 2009/0069170 | A1 * | 3/2009 | Wang et al. .................. 502/62 |

OTHER PUBLICATIONS

First Office Action and English Translation cited in corresponding Chinese Patent Application No. 200780049842.4 dated Feb. 10, 2011 (19 Pages).

\* cited by examiner

CLEAN, COMPRESSED SORBENT TABLETS

This application claims the benefit of U.S. Provisional Patent Application No. 60/866,172, filed Nov. 16, 2006, and U.S. Provisional Patent Application No. 60/912,090, filed Apr. 16, 2007.

BACKGROUND OF THE INVENTION

1. Field of the Invention

The present invention relates generally to desiccant tablets. More specifically, the present invention relates to an improved desiccant tablet using ethyl-vinyl acetate as a binder.

2. Description of Related Art

Any sorbent inserted into places such as disk drives, microelectronic devices, and the like, must maximize the amount of sorbent capacity within their bodies compared to their size because of limited size of the confines in which they are often placed. This demands a low profile type of sorbent, which excludes many traditional sorbent carrying devices such as canisters, capsules, and sachets. Compression of the sorbent, therefore, makes the most sense, since it will allow for the maximum amount of sorbent to be in a given space while keeping the space taken up by the sorbent low. Even with the benefit of a high absorbency per unit volume, compressing the sorbent brings its own group of factors that must be considered. First and foremost, the compressed sorbent must be clean. That means that it cannot be dusting or friable. Dusting occurs when particles that are loose or loosely bound to their neighbors are dislodged through minor abrasions or vibration, producing a find dust of particles. Friability, however, occurs when the compressed sorbent has particles dislodged through vigorous abrasion, either through vibration or agitation. Friability is determined as a percent loss based on the initial weight of the compressed sorbent minus the final weight of the compressed sorbent minus any absorbed moisture divided by the initial weight of the compressed sorbent and the result multiplied by 100. The actual test requires that the compressed sorbent is run through a Friability tester, such as a VanKel Friabilator. This type of tester has two rotating drums, one on either side of the unit that contain the test compressed sorbent, though any similarly operating friability tester would function as well. A standard test requires 200 revolutions.

Because of these two requirements, the sorbent must be tailored to hold as many of the particles together as possible, since most of the components a compressed sorbent would be placed in, such as electronics, cannot have small particles loose in their enclosed environments. Secondly the tablet must be substantially rigid, but still have some degree of flexibility. This allows for the part to retain its shape during transport, but not be so brittle that when it is fitted into the snug space that it is required to be placed, that the part shatters. Thirdly, there cannot be a high degree of variation between parts. Electronics manufacture requires a high degree of dimensional tolerance, due to the precise nature of construction of circuitry. These tolerance requirements even extend to housings that surround the electronics. Often, there is very little space available for the sorbent to be placed, as stated earlier. Since this space is so tight, and precise, the part must be able to have the same degree of tolerance, otherwise, the part could rattle around in the component and run the risk of having particles abrade off, or the part will just not fit, and be rejected. Thus, only when the part is deemed clean, fits snuggly, and has a low degree of dimensional variability, will the part be acceptable for use in a given device.

While the type of sorbent chosen, such as silica gel, molecular sieve, activated carbon, clay, or any combination thereof, does play a part in these aspects, the binder plays a key role. Typical binders used are polyethylene and polyvinylpyrrolidone (PVP). Polyethylene is a multifunctional polymer whose properties change with the degree of branching, degree of crystallinity and average molecular weight. The temperature at which these occur varies strongly with the type of polyethylene. For common commercial grades of medium-density and high-density polyethylene, the melting point is typically in the range 120-130° C. The melt point for average commercial low-density polyethylene is typically 105-115° C. Most Low Density Polyethylene, Medium Density Polyethylene, and High Density Polyethylene grades have excellent chemical resistance and do not dissolve at room temperature because of the crystallinity. Polyethylene (other than cross-linked polyethylene) usually can be dissolved at elevated temperatures in aromatic hydrocarbons (e.g. toluene, xylene) or chlorinated solvents (e.g. trichloroethane, trichlorobenzene). However, with the regular patterns of the chains, and a low possibility of substitution of side chains that would increase adhesion, polyethylene is not an ideal binder.

PVP is a white, hygroscopic powder. It has a high degree of solubility in both water and organic solvents, but is not so soluble in esters, ethers, hydrocarbons and ketones. PVP is notably quite adhesive to materials, which allow it to be used in film formation, and in specialty polymers. However, this high degree of solubility, while perfect for creating adhesive coatings or glues, does not make for an ideal solid binder, especially when ease of manufacturing is a concern.

For example, the current state of the art uses a PVP binder with activated carbon. While one can get a large degree of sorbent in the compressed body when rubbed, carbon particles come off onto the surface that it is rubbed against. More critically, the tolerance of the compressed sorbent does not meet the standard for the technology it is placed in. An activated carbon compressed sorbent made with PVP in the current state of the art has a tolerance of roughly 0.020 inches. The tolerance of a standard microelectronic device is 0.002 inches; a much higher degree of tolerance then currently available. To compensate for this, the current industry standard is to not attempt to maximize the amount of sorbent in the compressed body, as that maximization leads to having a large number of rejected parts that are too large to fit in the high dimensional tolerance spaces, because of the part's low dimensional tolerances. However, this is of course also undesirable, since having a lower amount of sorbent leads for a lower degree of absorption capability, and a lower amount of material as a whole lowers the dimensional size of the parts at the lower end of the size distribution, allowing them to be able to vibrate in the cavity, which leads to particulate creation. In an attempt to counteract this problem, multiple methods of manufacture have been utilized to hopefully enhance these requirements, but while still keeping with the traditional binder and sorbent combinations.

One such method requires that the carbon be mixed with a solution based PVP binder in a sigma mixer, then having the resulting mixture ground and classified due to agglomeration. After that, the mixture is compressed, and finally activated at 110 C. All of these steps are labor and energy intensive, and in the end, do not produce a highly clean part, that is dimensionally stable, and with a desirable degree of flexibility Accordingly, there is a need in the art to create parts that are dust free, have a high degree of dimensional stability and can withstand abrasion forces that normally occur in their environments. There also is a need in the art for a more streamlined and time effective method of creating a formed sorbent body, resulting in a more efficient manufacturing process.

SUMMARY OF THE INVENTION

The present invention addresses the foregoing needs in the art by providing an improved sorbent tablet and a method of making such sorbent tablet.

In one aspect of the invention, a pressed sorbent includes a sorbent including at least one of silica gel, molecular sieve, activated carbon, and clay and a binder including ethyl-vinyl acetate.

In another aspect of the invention, a method of forming a pressed sorbent includes mixing a desiccant including at least one of silica gel, molecular sieve, activated carbon, and clay and a binder including ethyl-vinyl acetate to form a mixture and pressing the mixture to form a pressed sorbent.

Preferably, the sorbent is formed by pressing without added heat. Heat may be added after sorbent is formed to activate and/or harden the particle.

An understanding of these and other aspects and features of the invention may be had with reference to the attached figures and following description, in which the present invention is illustrated and described.

DETAILED DESCRIPTION OF THE INVENTION

The proposed new method utilizes an ethyl-vinyl acetate-binder in sufficient quantities to allow for the binding of the sorbent with the binder and other sorbent particles, thus created a solid formed body once compressed. EVA is a polymer produced by random copolymerization of ethylene with vinyl acetate at a given ratio. The actual method of polymerization dictates the characteristics of the material produced. If done in a bulk, continuous polymerization reaction, the resulting product will be a low molecular weight copolymer that is excellent for coatings, hot melt adhesives, and other similar products. If done through a solution polymerization reaction, the resulting polymer will be of high molecular weight, excellent for more durable applications. The amount of vinyl acetate in the chain governs the overall crystallinity of the polymer itself. As the level increases, the degree of crystallinity decreases, making products similar to low density polyethylene or more flexible rubbers. As the level of vinyl acetate in the copolymer increases, the level of crystallinity found in polyethylene alone reduces from about 60% to 10%. This yields products ranging from materials similar to low density polyethylene to flexible rubbers. What is of particular note is the vinyl groups themselves, which are highly polar compared to the side chains of PE and PVP. This high degree of polarity allows the polymer to be more adhesive to itself and to other objects around it, hence it being an excellent hot melt and heat seal adhesive. However, in that format, the EVA is either extruded or coated onto the desired surface. For the present invention, a more solid form that is ground to a fine powder is required. Specifically, the powder generally includes substantially cylindrical particles that have a diameter of from about 5 microns to 50 microns, more preferably from about 10 microns to about 40 microns, and still more preferably from about 15 to about 25 microns. The sorbent particles generally have a diameter on the order of from about 50 mesh to about 200 mesh.

From a process standpoint, the use of EVA allows for a free flowing pre-formed product, suitable for automation, without the use of additional processing aids or flow agents such as stearates. Also, the EVA need not be added to the sorbent and any other desired component in a wet format as in PVP. By being added in a dry format, this eliminates any agglomeration that may occur during mixing in the Sigma Mixer. Without the agglomeration, there is no need for the additional step of grinding, sifting and classifying that occurs under the old process.

Instead, parts using EVA as a binder can go straight from mixing to a compression step, during which a multi-station press can be used with an automated feeder. The parts can be compressed between 10,000 and 50,000 psi, which will produce a part that will hold its shape before activation. Of course a person having ordinary skill in the art would know that the upper limit of compression is only governed by the type of tooling used, and the maximum rating of the press being operated. However, it is more preferred to compress between 16,000 and 37,000 psi.

Figure 1A:
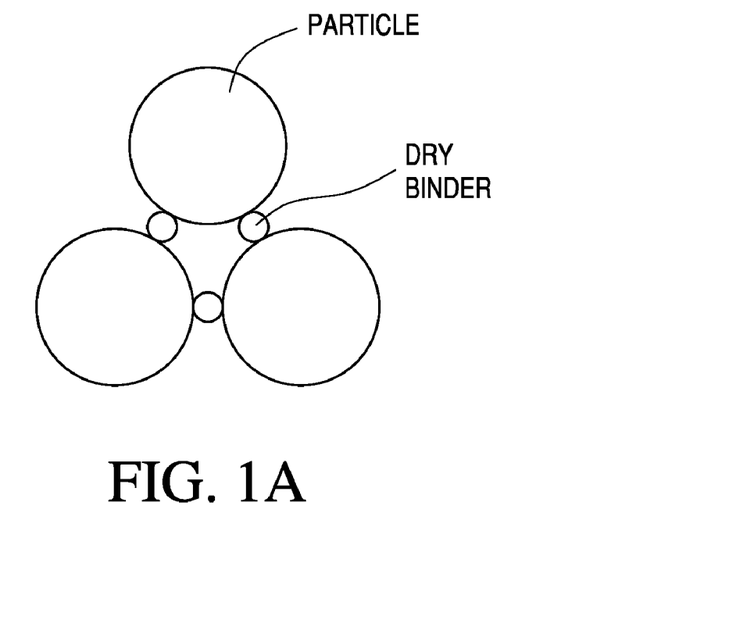
FIGS. 1A and 1B are representations of particle bonding of a sorbent form according to the present invention and a conventional sorbent form, respectively.
Figure 1B:
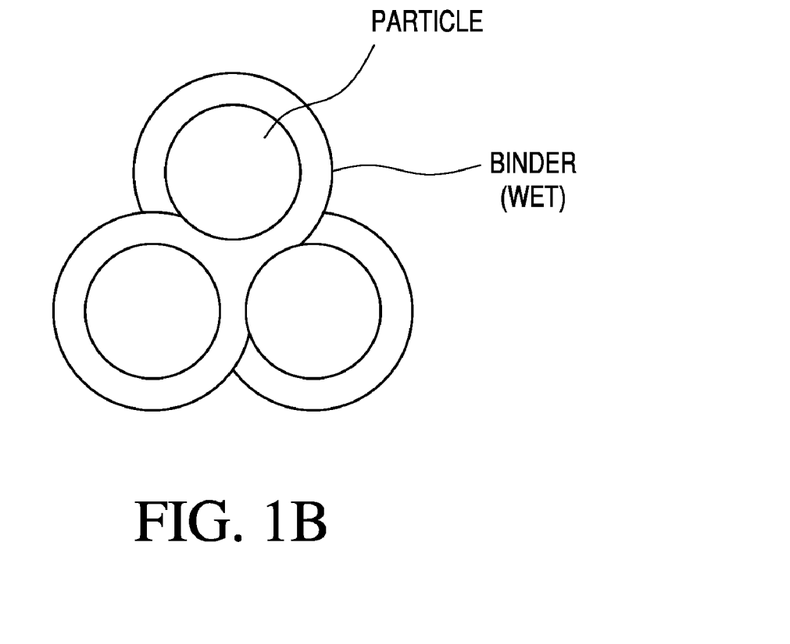

Because the mixture comprising EVA and sorbent is mixed in a dry state instead of the conventional wet mixture of PVP, the particle bonding is quite different after compression. This difference is illustrated in FIGS. 1A and 1B. Specifically, as illustrated in FIG. 1A, the dry binder particles tend to reside only between contacting positions of the sorbent particles. Conversely, as illustrated in FIG. 1B, the wet binder tends to coat each of the sorbent particles. As a result, when EVA is used as a binder, more of the sorbent particle is exposed to the atmosphere compared with the PVP process. Moreover, this allows more space for the accommodation in the sorbent material for additional materials. For example, salts or the like may be added to the mixture for additional adsorptive capability. For example, the inventors have made parts including K2CO3, Na2CO3, potassium hydrogen carbonate, potassium bicarbonate, CaCl, LiCl, and sodium chloride. Of course, other salts are known and any salt could be added to the parts contemplated by the invention, ultimately depending upon the results desired.

After pressing the parts, an activation step usually follows. Another benefit with using a dry binder is that the activation time and temperature associated with this step is less. Activation is required so that all or most moisture and volatiles are driven off the pressed form, thus maximizing the adsorbent property of the product. When a wet binder is used, there is a high degree of moisture left in the "green" or un-activated part. In order to obtain a useful part, it is required to activate the product at roughly 110 C for at least four hours. When the EVA binder is used, however, there is no need to desorb the residual moisture, since it is not present, thus one can lower the activating time and temperature. Ideally, an EVA based part can cure at between 90-110 C for around two hours. Of course, those of skill in the art will understand that curing temperatures can vary greatly based on the sorbent used and the heat source. Regardless of the heat source and sorbent, however, pressed sorbents made with EVA cure much quicker than corresponding parts made with conventional binders.

In some applications, it may be desirable to not activate the part, but it generally is still desirable to "harden" the part. Hardening the part involves subjecting the part to an elevated temperature that is lower than the activation temperature or subjecting the part to a temperature equal to or greater than the activation temperature, but for less time than it takes to dry the part. Specifically, the part can be sufficiently heated to begin to melt the binder, such that when it is again cooled, the bond between the binder and the sorbent particles is increased, thereby strengthening the part. For example, there are instances in which it is desirable to ship non-activated parts, but the parts should be heated to the hardening temperature, to be strengthened for shipping and handling.

The formation of specific sorbents using the above-described process, and more appropriately the exact proportions of sorbent to binder, is dependent upon the amount of adsorption desired and the type of sorbent used. Generally, a fully functional part can be made with at least 1% of binder up to 99% binder. It should be noted that mechanical feeding in an automated system may dictate the maximum amount of binder used, but that would not preclude the use of higher percentages of binder with a single station press that was manually fed. Of course, as stated earlier, the desired effect is usually to maximize the amount of sorbent in proportion to the binder, to maximize the absorption capability.

While there are automation considerations, the ratios of sorbent to EVA are somewhat dependent upon the type of sorbent or sorbent mixture used, and the desired absorptive properties. In the case of carbons, which are used to absorb volatiles, a ratio of 86% 116 Carbon to 14% EVA binder by weight has been found to produce a viable part. Ratios of 88% carbon to 12% binder by weight, 91% carbon to 9% binder by weight and 94% carbon to 6% EVA also produce a viable part and are preferred. As is known in the art, activated carbons may include, for example, wood-based, cotton-based, and petroleum-based carbons may be used.

For silica gels, used when moisture absorption is required, a mixture of 91% Silica Gel to 9% binder is a preferred mixture, yet a ratio of 94% silica gel to 6% EVA binder is more preferred, while 97% silica gel to 3% EVA binder is even more preferred.

In some cases it is desirable to have a mixture of sorbents, in order to enhance and maximize their unique properties; as in the case of a silica gel/carbon mix for protection from both moisture and volatiles simultaneously. In that instance it was preferred to have a mixture of 84% silica gel, 10% Carbon and 6% EVA, while it was even more preferred to have 87% SG, 10% Carbon and 3% EVA. Of course, the actual proportions are dependent upon the environment the sorbent is exposed to. If the environment requires more moisture adsorption, the amount of silica gel would be maximized, and the amount of EVA would be minimized while keeping enough carbon for volatile absorption. If the situation was reversed, and more volatiles are present, then the amount of carbon would be increased, and the amount of silica gel decreased, while again minimizing the required EVA binder. In one specific example, the inventors have made a usable sorbent form including 81% (by weight) B-Gel, 10% 116 Carbon and 9% EVA binder. Any number of compositions and combinations are attainable using EVA as a binder.

Once created, the parts have a high degree of resistance to friability. A sample of carbon/silica gel parts was taken, in which a number of samples were made with the EVA binder, and the other samples were created with PVP. On average, the PVP samples had a weight of 11.8 while the EVA parts had an initial weight of 11.7. Each set of samples were then processed through the friability testing regimen detailed above. Once out, the samples were then weighed and it was found that the PVP samples had a friability of 5.70%. However, the EVA had a friability of 0.38%. This indicates that the EVA part is far more durable against abrasion and therefore less dusty then a corresponding PVP part.

The part also exhibits a high degree of dimensional stability. A series of the same part were made, with one set utilizing the PVP binder and the other utilizing the EVA blinder. Out of the sample, the PVP binder parts had a maximum difference (that is the difference between the maximum value observed and the minimum value observed) in length of 0.622 mm, a difference in width of 0.494 mm and a difference in height of 0.579 mm. The EVA however, had a difference in length of 0.03 mm, a difference in height of 0.05 mm and a difference in width of 0.04 mm. This indicates that when using the EVA binder, it is more likely that you will have parts that are similar within a narrower range of distribution than you have with the PVP. While this seems insignificant, especially considering that the measurements are in tenths and hundredth of millimeters, it is important to note again that electronic components and spaces have high degrees of tolerance, and the true scope of the variance is only apparent when you compare the distribution ranges together. This is most notable in length, where the potential range of distribution for PVP is 20 times larger then the range of distribution of the EVA. Such a wide range is not as acceptable to the electronics industry, versus the narrow 0.03 mm range of distribution available from EVA. Thus by using EVA as a binder, one can achieve a relatively clean part, that has a high degree of dimensional stability, versus the current state of the art.

Figure 2:
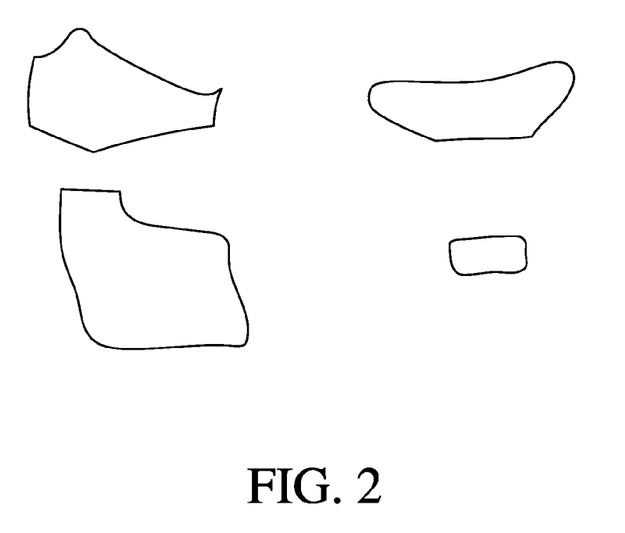
FIG. 2 illustrates top views of a number of pressed sorbents made according to the present invention.

Because of its relative stability, the inventors have also found that pressed sorbents having complex geometries can be made using EVA as a binder. This is particularly useful in some electronics industries in which space is extremely limited and only unique shapes can be accommodated when a minimum surface area of the sorbent tablet is required. FIG. 2 illustrates some exemplary shapes that have been made by the inventors using the processes described above. As illustrated, the shapes may include steps, arcuate portions, and relatively sharp corners, among other features. Such shapes may not be attainable with PVP as a binder, and even if possible, would be much more friable and much less precise.

In addition to easier and quicker manufacture, increased stability and improved friability, the inventors also have found that sorbent parts made with EVA as a binder are stronger. Specifically, such parts have improved crush strength as exhibited before and after activation. For example, for first, second, and third experimental batches of sorbent parts, each batch including 10,000 parts made from a ratio of 86% 116 carbon to 14% EVA binder by weight, the average crush strength was found to be 13.37 lbs., 11.67 lbs., and 11.58 lbs., respectively, before activation, and 23.59 lbs., 25.96 lbs., and 29.23 lbs., respectively, after activation. Before activation, the crush strengths for a sampling of the first batch ranged from 11.20 lbs. to 14.80 lbs., the crush strengths for a sampling of the second batch ranged from 11.10 lbs. to 12.60 lbs., and the crush strengths for a sampling of the third batch ranged from 11.05 lbs. to 12.10 lbs. After activation, the crush strengths for a sampling of the first batch ranged from 21.15 lbs. to 26.20 lbs., the crush strengths for a sampling of the second batch ranged from 23.55 lbs. to 28.60 lbs., and the crush strengths for a sampling of the third batch ranged from 28.25 lbs. to 30.25 lbs.

Forms having a ratio of 91% silica gel to 9% EVA binder also have been made. Depending upon the size of the forms and the pressing equipment available, such forms have been made on the order of about 45 per minute to about 50,000 parts per hour. These parts exhibit after-activation crush strengths of from about 3.10 lbs. for smaller parts to about 70.25 lbs. for larger, more slowly pressed parts. The amount of EVA binder used can dictate the crush strength of the part to be manufactured. For example, the parts just described have been found to have crush strengths similar to like-shaped parts made with PVP as a binder. Including more binder will increase the crush strength of the part.

The inventors also have made pressed sorbent forms having ratios by weight of 87% carbon (impregnated with 2.5% $K_2CO_3$) to 13% EVA binder, 85% carbon (impregnated with 2.5% $K_2CO_3$) to 15% EVA binder, 83% carbon (impregnated with 2.5% $K_2CO_3$) to 17% EVA binder. These sorbent forms also been manufactured that show increased crush strength over similar parts using different binders. For example, the average crush strengths before and after activation for the forms having 13%, 15%, and 17% EVA binder by weight were 3.52 lbs. and 13.52 lbs., 4.83 lbs. and 17.56 lbs., and 5.58 lbs. and 23.14 lbs., respectively.

Parts made with an EVA binder also are capable of being much cleaner than their conventional counterparts. In some electronic applications, for example, cleanliness, as measured by a level of extractable ions, is a consideration. Using EVA as a binder allows more control over the ions that are present in the binder, as opposed to conventional binders, in which there is virtually no control over the amount of ions.

Forms using EVA as a binder also were found through experimentation to perform similarly for adsorption and desorption, and were found to provide similar results, although slightly higher values with regard to dynamic headspace testing, as done according to IDEMA Dynamic Headspace Analysis Standard M11-99.

As noted above, pressed sorbents are useful in a number of different applications, and following is a discussion of a sorbent material using ethyl vinyl acetate as a binder for use in a hearing-aid drying apparatus. Specifically, several devices have been proposed for substantially removing moisture from hearing aids, which, in the presence of moisture, can become corroded, short-circuited, or otherwise unusable For example, U.S. Pat. No. 5,640,783 discloses a hearing aid drying appliance that generally includes an accessible compartment having a desiccant component therein dividing the compartment into two regions. Air or another gas is circulated through the regions and the desiccant component, to reduce moisture in the hearing aids contained in the two regions. A heater preferably also is employed to warm the air in the device.

A conventional block for use with a hearing aid drying apparatus is available from Multisorb Technologies and is made up of silica gel, 116.Carbon and 7% PVP. The process for making the conventional block is time consuming. Specifically, the process involves mixing the three components and introducing between 25% and 30% moisture. Subsequent drying is then required. All told, the process takes on average up to about 6 hours to create the mixture used to create the block. Moreover, once the block is formed, it is typically cooked for up to 10 hours at 230° F. Thus, creation and activation of conventional desiccant blocks is time and energy consuming.

The inventors have found that by replacing PVP as the binder with EVA, a new desiccant block can be made that has adsorptive properties similar to those of the conventional desiccant block described above, but that is stronger and easier to manufacture. More specifically, the desiccant material according to the preferred embodiment utilizes an ethylvinyl acetate binder in sufficient quantities to allow for the binding of the sorbent with the binder and other sorbent particles.

Formulations for creating a desiccant block preferably for use in a hearing aid drying apparatus according to a preferred embodiment are shown in Table 1.

TABLE 1

Desiccant formulations.

| # | Silica Gel (weight (% of weight)) | 116. Carbon (weight (% of weight)) | EVA (weight (% of weight)) |
|---|---|---|---|
| 1 | 4.82 lbs. (80.4%) | 0.34 lbs. (5.6%) | 0.84 lbs. (14%) |
| 2 | 4.99 lbs. (82.3%) | 0.35 lbs. (5.7%) | 0.72 lbs. (12%) |
| 3 | 5.10 lbs. (84.2%) | 0.36 lbs. (5.8%) | 0.6 lbs. (10%) |
| 4 | 5.21 lbs. (86.8%) | 0.37 lbs. (6.2%) | 0.48 lbs. (8%) |
| 5 | 5.19 lbs. (86.5%) | 0.39 lbs. (6.5%) | 0.42 lbs. (7%) |

As set forth in Table 1, each of the formulations consists of silica gel, 116.Carbon, and EVA. The silica gel used was 50-mesh and the carbon was 5×200-mesh. Each of these six-pound formulations was mixed in an eight quart V blender for 4 minutes with the shell speed set to 6 and the intensifier bar speed set to 10. After the four minutes, the mixture was ready for further processing into a desired form. Four minutes is considerably shorter than the four to six hours required to make the same formulations with PVP instead of EVA as a binder, because, as discussed above, the EVA process is completely dry.

The inventors also have found that blocks formed from the formulations of Table 1 using EVA as a binder have similar adsorption rates as blocks formed using PVP as a binder. For example, Tables 2 and 3 illustrate two identical tests in which conventional blocks using 7% PVP as a binder and blocks according to formulations 2, 3, and 4 of Table 1 were placed in a chamber having 95% humidity. Each block was weighed at established time intervals and the percentage of that measured weight that was picked-up was calculated as the difference between the measured weight and original weight divided by the original weight, expressed as a percentage. The blocks used in all examples were pressed and measured approximately 0.655 inches in height, 1.625 inches in width and 3.000 inches in length.

TABLE 2

Pickup Rates for Block 1 of formulations

| Time (hrs) | PVP weight (g) | % Pickup | 8% EVA weight (g) | % Pickup | 10% EVA weight (g) | % Pickup | 12% EVA weight (g) | % Pickup |
|---|---|---|---|---|---|---|---|---|
| 0 | 43.7858 | 0.0000 | 45.2958 | 0.0000 | 44.5580 | 0.0000 | 44.1958 | 0.0000 |
| 1 | 45.4800 | 3.8693 | 47.5248 | 4.9210 | 46.7651 | 4.9533 | 46.4655 | 5.1356 |
| 2 | 46.8680 | 7.0393 | 49.1926 | 8.6030 | 48.3965 | 8.6146 | 48.0837 | 8.7970 |
| 3 | 47.7300 | 9.0079 | 50.2123 | 10.8542 | 49.3894 | 10.8429 | 49.0594 | 11.0047 |
| 4 | 48.7288 | 11.2890 | 51.3196 | 13.2988 | 50.4677 | 13.2629 | 50.0998 | 13.3587 |
| 5 | 49.3866 | 12.7914 | 52.0446 | 14.8994 | 51.1724 | 14.8445 | 50.7811 | 14.9003 |
| 6 | 50.1503 | 14.5355 | 52.8469 | 16.6706 | 51.9344 | 16.5546 | 51.5202 | 16.5726 |
| 7 | 50.8440 | 16.1198 | 53.5547 | 18.2333 | 52.6192 | 18.0915 | 52.1603 | 18.0209 |
| 23 | 56.3533 | 28.7022 | 58.3013 | 28.7124 | 57.1910 | 28.3518 | 56.4402 | 27.7049 |

TABLE 2-continued

Pickup Rates for Block 1 of formulations

| Time (hrs) | PVP weight (g) | % Pickup | 8% EVA weight (g) | % Pickup | 10% EVA weight (g) | % Pickup | 12% EVA weight (g) | % Pickup |
|---|---|---|---|---|---|---|---|---|
| 31 | 57.4592 | 31.2279 | 58.5573 | 29.2775 | 57.4383 | 28.9068 | 56.6504 | 28.1805 |
| 47 | 58.0440 | 32.5635 | 58.6391 | 29.4581 | 57.5072 | 29.0614 | 56.7125 | 28.3210 |
| 55 | 58.0477 | 32.5720 | 58.6344 | 29.4478 | 57.5037 | 29.0536 | 56.7012 | 28.2954 |

TABLE 3

Pickup Rates for Block 2 of formulations

| Time (hrs) | PVP weight (g) | % Pickup | 8% EVA weight (g) | % Pickup | 10% EVA weight (g) | % Pickup | 12% EVA weight (g) | % Pickup |
|---|---|---|---|---|---|---|---|---|
| 0 | 43.8340 | 0.0000 | 45.6848 | 0.0000 | 44.4960 | 0.0000 | 44.1950 | 0.0000 |
| 1 | 45.6295 | 4.0961 | 47.9201 | 4.8929 | 46.7919 | 5.1598 | 46.4730 | 5.1544 |
| 2 | 47.0670 | 7.3756 | 49.5942 | 8.5573 | 48.4687 | 8.9282 | 48.0923 | 8.8184 |
| 3 | 47.9697 | 9.4349 | 50.6273 | 10.8187 | 49.4858 | 11.2140 | 49.0590 | 11.0058 |
| 4 | 48.9934 | 11.7703 | 51.7438 | 13.2626 | 50.5715 | 13.6540 | 50.0764 | 13.3078 |
| 5 | 49.6700 | 13.3139 | 52.4806 | 14.8754 | 51.2846 | 15.2567 | 50.7505 | 14.8331 |
| 6 | 50.4363 | 15.0621 | 53.2919 | 16.6513 | 52.0543 | 16.9865 | 51.4830 | 16.4906 |
| 7 | 51.1376 | 16.6620 | 54.0000 | 18.2012 | 52.7310 | 18.5073 | 52.1158 | 17.9224 |
| 23 | 56.5780 | 29.0733 | 58.7938 | 28.6944 | 57.1517 | 28.4423 | 56.4206 | 27.6629 |
| 31 | 57.6256 | 31.4632 | 59.0547 | 29.2655 | 57.3684 | 28.9293 | 56.6337 | 28.1450 |
| 47 | 58.1511 | 32.6621 | 59.1352 | 29.4417 | 57.4303 | 29.0685 | 56.6981 | 28.2908 |
| 55 | 58.1445 | 32.6470 | 59.1302 | 29.4308 | 57.4272 | 29.0615 | 56.6910 | 28.2747 |

As shown in Table 2, for block 1 of each formulation, the % pickup over a 55 hour period was 32.5720% for the conventional PVP block and was 29.4478%, 29.0536%, and 28.294% for each of the blocks using 8% EVA, 10% EVA, and 12% EVA as the binder, respectively. As shown in Table 3, for block 2 of each formulation, the % pickup over a 55 hour period was 32.6470% for the conventional PVP block and was 29.4308%, 29.0615%, and 28.2747% for each of the blocks using 8% EVA, 10% EVA, and 12% EVA as the binder, respectively. For the first 7 hours of operation, the blocks using EVA as the binder had higher pickup rates than the conventional PVP block. The results of Tables 2 and 3 are graphically illustrated in FIGS. 3 and 4, respectively.

Figure 3:
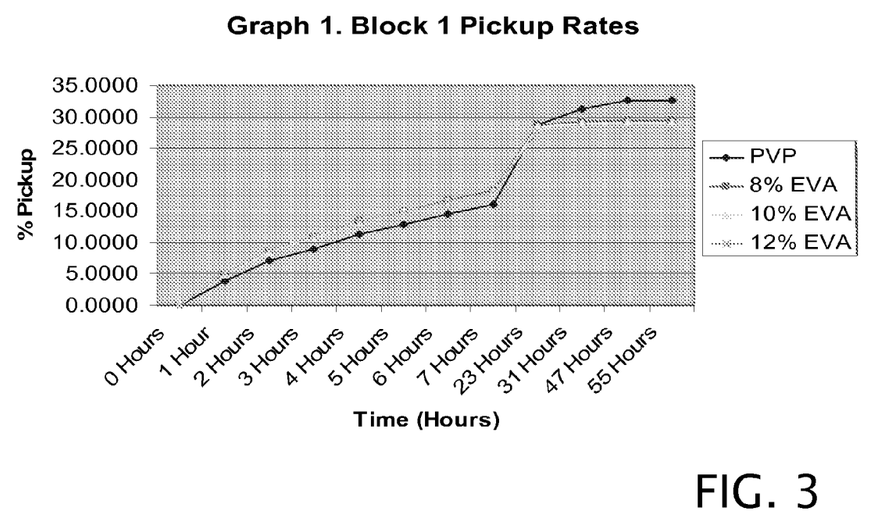
FIG. 3 graphically illustrates the results shown in Table 2.
Figure 4:
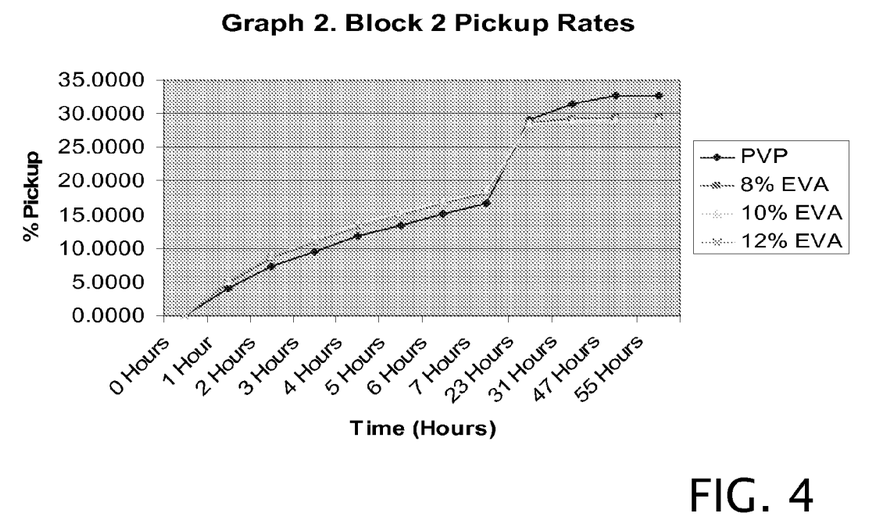
FIG. 4 graphically illustrates the results shown in Table 3.

After conducting the tests depicted in Tables 2 and 3 and FIGS. 3 and 4, the desiccant blocks were placed in a lab oven at 100° C. for re-activation. The weight of each block at specific time intervals is illustrated in Table 4.

According to the foregoing, it is evident that desiccant blocks having similar adsorption characteristics can be formulated using either PVP or EVA as a binder. However, blocks formed using the EVA binder are more easily and quickly produced. Moreover, the blocks formulated using EVA are stronger. Table 5 shows the relative crush strengths in pounds of currently commercially produced blocks activated in an oven at 230° F. for approximately 10 hours. Table 6 shows the relative crush strengths in pounds of blocks made with formulation 5 of Table 1, which were passed through an ARPAC 48" heat tunnel for 58 seconds at 475° F. Table 7 shows the relative crush strengths in pounds of blocks made with formulation 5 of Table 1, which were passed through an ARPAC 48" heat tunnel for 120 seconds at 475° F. In Tables 6 and 7, each group consisted of 7 blocks spaced evenly across the width of the heat tunnel. The blocks for each group were identical. The compared tablets were substantially rect-

TABLE 4

Activation at 100° C.

| Time (hrs) | PVP1 weight (g) | PVP2 weight (g) | 8% EVA1 weight (g) | 8% EVA2 weight (g) | 10% EVA1 weight (g) | 10% EVA2 weight (g) | 12% EVA1 weight (g) | 12% EVA 2 weight (g) |
|---|---|---|---|---|---|---|---|---|
| 0 | 58.0477 | 58.1445 | 58.6344 | 59.1302 | 57.5037 | 57.4272 | 56.7012 | 56.6910 |
| 1 | 49.5107 | 49.5749 | 50.7702 | 51.1555 | 50.1406 | 50.0404 | 49.7037 | 49.7050 |
| 2.2 | 45.5191 | 45.5610 | 46.8959 | 47.1882 | 46.4657 | 46.4004 | 46.1676 | 46.0894 |
| 3.5 | 43.7933 | 43.8341 | 45.0225 | 45.3575 | 44.5852 | 44.5252 | 44.3165 | 44.2551 |
| 4.5 | 43.5495 | 43.5957 | 44.7010 | 45.0500 | 44.1873 | 44.1354 | 43.9056 | 43.8633 |
| 5.5 | 43.4006 | 43.4425 | 44.4939 | 44.8556 | 43.9577 | 43.9066 | 43.6635 | 43.6352 |
| 22 | 43.2789 | 43.3245 | 44.3326 | 44.7039 | 43.7612 | 43.7146 | 43.4583 | 43.4457 | angular in form having a length of about 3.000 inches, a width of about 1.625 inches and a height of about 0.655 inches.

TABLE 5

PVP Crush Strength (lbs.)

| Group | Block 1 | Block 2 | Block 3 | Block 4 | Block 5 | Block 6 | Block 7 |
|---|---|---|---|---|---|---|---|
| 1 | 32.60 | 38.70 | 36.80 | 33.05 | 39.30 | 28.30 | 50.40 |
| 2 | 43.00 | 40.35 | 42.80 | 40.80 | 41.00 | 44.30 | 43.95 |
| 3 | 44.85 | 49.15 | 23.90 | 42.70 | 46.30 | 50.00 | 57.65 |

TABLE 6

Crush Strength (lbs.)

| Group | Block 1 | Block 2 | Block 3 | Block 4 | Block 5 | Block 6 | Block 7 |
|---|---|---|---|---|---|---|---|
| 1 | 61.90 | 61.10 | 65.05 | 67.05 | 67.50 | 71.50 | 74.10 |

TABLE 7

Crush Strength (lbs.)

| Group | Block 1 | Block 2 | Block 3 | Block 4 | Block 5 | Block 6 | Block 7 |
|---|---|---|---|---|---|---|---|
| 1 | 77.95 | 76.55 | 79.55 | 77.45 | 86.80 | 86.65 | 84.30 |
| 2 | 76.80 | 76.40 | 81.35 | 85.35 | 83.60 | 87.45 | 88.45 |
| 3 | 74.00 | 79.00 | 81.55 | 83.75 | 87.70 | 82.85 | 86.10 |
| 4 | 74.80 | 80.30 | 83.85 | 82.10 | 83.65 | 84.80 | 85.00 |
| 5 | 74.45 | 73.00 | 84.90 | 83.60 | 81.55 | 84.65 | 79.65 |

Thus, the average crush strength for the PVP blocks shown in Table 5 is 41.42 lbs, while the average crush strength of the 7% EVA blocks was 66.89 pounds in Table 6 and 81.71 pounds in Table 7.

While the above discussed only silica gel and 116.carbon as part of the composition, various other adsorbents including but not limited to molecular sieve, activated carbon, calcium oxide, potassium carbonate, sodium chloride, and absorbents such as oxygen-absorbing materials, ethylene-absorbing materials and humectants may be used with the EVA noted above, and mixtures may be used in approximately the same proportions as for the EVA.

In the examples described above, the EVA may comprise from between 7% by weight and 14% by weight of the entire desiccant material. As illustrated in Tables 5-7, a desiccant with 7% EVA is stronger than a conventional desiccant with 7% PVP.

As described herein, the inventors have found that using EVA as a binder in a pressed sorbent can create an improved sorbent that is easier and faster to manufacture. Moreover, EVA can be used to bind more than one sorbents, such as, for example, to remove one or more of moisture, oxygen, volatiles, and the like from a space.

Parts made with EVA binder also may be coated. For example, any known coatings can be applied to the parts, to provide additional sorbent properties. Such coatings may include Teflon, powder coatings, polyethylene, ethyl vinyl acetates, olefin polymers, olefin copolymers, or water-based coatings.

The foregoing embodiments of the invention are representative embodiments, and are provided for illustrative purposes. The embodiments are not intended to limit the scope of the invention. Variations and modifications are apparent from a reading of the preceding description and are included within the scope of the invention. The invention is intended to be limited only by the scope of the accompanying claims.

We claim:

1. A pressed sorbent comprising:
    a pressed sorbent part comprising a sorbent material comprising at least one of silica gel, molecular sieve, activated carbon, and clay;
    a binder comprising ethyl-vinyl acetate and present in an amount greater than 30% of the weight of the pressed sorbent part; and
    further comprising a coating applied on the exterior of the pressed sorbent part, after the pressing of the sorbent part.

2. The pressed sorbent according to claim 1, wherein the binder is present in an amount of from about 30% to about 50% of the weight of the pressed sorbent.

3. The pressed sorbent according to claim 1, wherein the binder is present in an amount of from about 30% to about 40% of the weight of the pressed sorbent.

4. The pressed sorbent according to claim 1, wherein the binder is present in an amount of about 30% of the weight of the pressed sorbent.

5. The pressed sorbent according to claim 1, wherein the binder comprises generally spherical particles having a diameter of about 5 microns to about 50 microns and the sorbent comprises generally spherical particles having a diameter of between about 50 mesh and about 200 mesh.

6. The pressed sorbent according to claim 5, wherein the binder particles have a diameter of about 10 microns to about 40 microns and the sorbent particles have a diameter of between about 50 mesh and about 200 mesh.

7. The pressed sorbent according to claim 6, wherein the binder particles have a diameter of about 15 microns to about 25 microns and the sorbent particles have a diameter of between about 50 mesh and about 200 mesh.

8. The pressed sorbent according to claim 1, further comprising a salt.

9. The pressed sorbent of claim 8, wherein the coating is a water-based coating.

10. The pressed sorbent according to claim 1, the sorbent including an arcuate shape.

11. The pressed sorbent according to claim 1, wherein the sorbent material is an activated carbon comprising one of a wood-based carbon, a coconut-based carbon, and a petroleum-based carbon.

12. The pressed sorbent of claim 1, wherein the coating consists of at least one member selected from the group of polyethylene, olefin polymers, and olefin copolymers.

13. The pressed sorbent of claim 12, wherein the coating is a powder coating.

14. The pressed sorbent of claim 1, wherein the coating comprises polyethylene.

15. A method of forming a pressed sorbent comprising the steps of:
    forming a pressed sorbent part by mixing a desiccant comprising at least one of silica gel, molecular sieve, activated carbon, and clay and a binder comprising ethyl-vinyl acetate to form a mixture;
    pressing the mixture, in the absence of an external heat source, to form a pressed sorbent part; and
    applying a coating to the pressed sorbent part.

16. The method according to claim 15, wherein the mixture is pressed at substantially room temperature.

17. The method according to claim 16, further comprising the step of activating the pressed sorbent.

18. The method according to claim 17, wherein activating the pressed sorbent tablet is accomplished by heating the pressed sorbent at a temperature of about 100° C. to about 500° C.

19. The method according to claim 15, further comprising the step of hardening the pressed sorbent by exposing the pressed sorbent to a hardening temperature greater than the temperature at which the mixture is pressed.

20. The method according to claim 19, wherein the hardening temperature is sufficient to soften the binder material to promote adhesion of the particles comprising the pressed sorbent.

21. The method according to claim 15, wherein the coating consists of at least one material selected from polyethylene, ethyl vinyl acetate, olefin polymer, and olefin copolymer.

22. The method according to claim 15, wherein the step for forming the pressed sorbent is a dry-process in which the mixture is free from liquids.

23. The method according to claim 22, wherein the mixture is pressed at a pressure of between about 16,000 pounds per square inch and about 37,000 pounds per square inch.

24. The method according to claim 15, further comprising including in the mixture a salt.

25. The method according to claim 15, wherein the mixture is pressed to form a sorbent tablet at a pressure of between about 10,000 pounds per square inch and about 50,000 pounds per square inch.

26. The method of claim 15, wherein the coating consists of at least one member selected from the group of polyethylene, olefin polymers, and olefin copolymers.

27. The method of claim 24, wherein the coating is a water-based coating.

* * * * *